(12) United States Patent
Naito et al.

(10) Patent No.: US 7,259,488 B2
(45) Date of Patent: Aug. 21, 2007

(54) ROTARY ELECTRIC MACHINE

(75) Inventors: Shinya Naito, Iwata (JP); Hino Haruyoshi, Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 11/496,647

(22) Filed: Jul. 31, 2006

(65) Prior Publication Data

US 2006/0267437 A1    Nov. 30, 2006

Related U.S. Application Data

(62) Division of application No. 10/476,501, filed on Oct. 30, 2003.

(30) Foreign Application Priority Data

Jul. 31, 2001  (JP)  ............... 2001-232630
Jul. 31, 2002  (WO) ............... PCT/JP02/07797

(51) Int. Cl.
*H02K 21/24* (2006.01)
*H02K 1/27* (2006.01)
*H02K 21/14* (2006.01)
*H02K 1/22* (2006.01)

(52) U.S. Cl. ............... 310/156.32; 310/156.08; 310/268

(58) Field of Classification Search ........... 310/156.32, 310/268, 156.33–37, 156.38, 51, 156.08
See application file for complete search history.

(56) References Cited

U.S. PATENT DOCUMENTS

| | | | |
|---|---|---|---|
| 3,401,287 A | 9/1968 | French et al. | 310/168 |
| 3,678,311 A | 7/1972 | Mattingly | 310/156.32 |
| 3,867,655 A | 2/1975 | Stengel et al. | 310/66 |
| 4,329,636 A | 5/1982 | Uchida et al. | 318/721 |
| 4,634,906 A | 1/1987 | Grosjean | 310/268 |

(Continued)

FOREIGN PATENT DOCUMENTS

FR    2606951    5/1988

(Continued)

OTHER PUBLICATIONS

English translation of International Preliminary Examination Report dated May 6, 2003.

(Continued)

*Primary Examiner*—Burton S. Mullins
*Assistant Examiner*—Erik Preston
(74) *Attorney, Agent, or Firm*—Young Basile

(57) ABSTRACT

A rotary electric machine comprises a rotating shaft rotatably supported by bearings, a rotor attached integrally with the shaft and a stator facing the rotor. The stator includes a plurality of coils arranged substantially in a circular form in a rotating direction of the shaft. The rotor includes a circular-disc rotor yoke made of a ferromagnetic material, such as iron. Depressed and raised portions on a surface of the rotor yoke facing the stator, except for the center portion, are arranged in a circumferential direction of the rotor yoke. N-pole and S-pole magnets are alternately arranged in the depressed portions. Therefore, in addition to torque generated by the magnets, reluctance torque is generated between the raised portions on the rotor yoke side and the teeth on the stator side, thus making it possible to increase the range of rotation speeds of the motor.

9 Claims, 9 Drawing Sheets

U.S. PATENT DOCUMENTS

| | | | |
|---|---|---|---|
| 4,835,840 A | 6/1989 | Stokes | |
| 4,902,924 A | 2/1990 | Ushiro et al. | 310/268 |
| 4,918,346 A | 4/1990 | Tajima et al. | |
| 5,334,899 A | 8/1994 | Skybyk | 310/268 |
| 5,736,798 A * | 4/1998 | O'Brien et al. | 310/51 |
| 5,962,942 A | 10/1999 | Pullen et al. | |
| 6,157,112 A | 12/2000 | Suzuki et al. | 310/269 |

FOREIGN PATENT DOCUMENTS

| | | |
|---|---|---|
| JP | 53115012 | 7/1978 |
| JP | 54098905 | 4/1979 |
| JP | 59103555 | 6/1984 |
| JP | 6268471 | 4/1987 |
| JP | 6312759 | 8/1988 |
| JP | 10225033 A | 9/1998 |
| JP | 2001136721 A | 5/2001 |

OTHER PUBLICATIONS

International Search Report dated Nov. 26, 2002.
Search report by European Patent Office Dated Jun. 12, 2006.
Profumo F et al: "Axial Flux machines drives: A New Variable Solution For Electric Cars" Aug. 5, 1996. Industrial Electronics, Control, and Instrumentation, 1996., Proceedings of the 1996 IEEE IECON 22nd International Conference on Talpe, Taiwan Aug. 5-10, 1996, New York, NY USA IEEE, US pp. 34-40, XPO10203377 ISBN: 0-7803-2774-6. Figure 8A.

* cited by examiner

F I G. 1 0
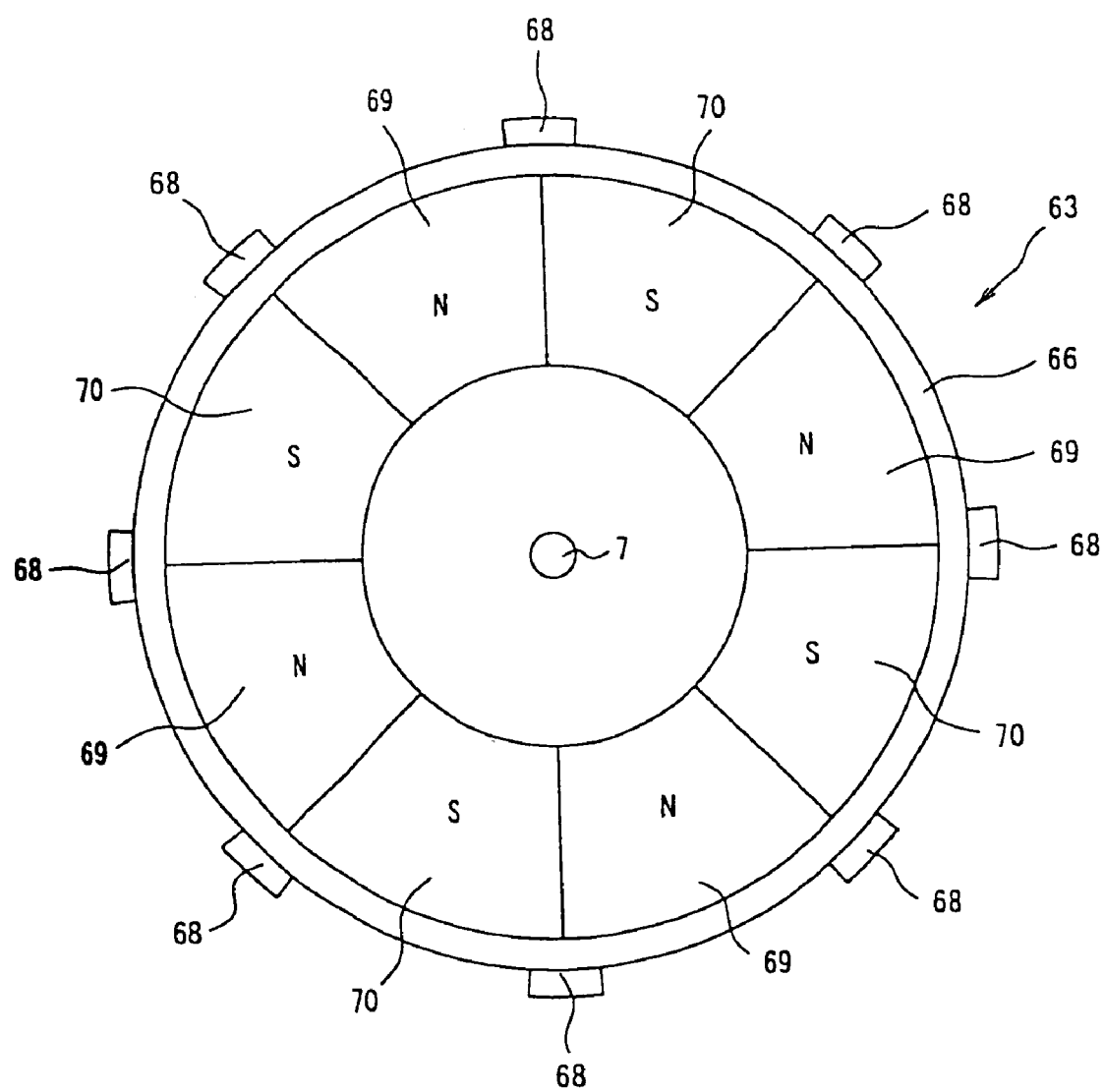

ROTARY ELECTRIC MACHINE

This application is a divisional patent application of Ser. No. 10/476,501 filed on Oct. 30, 2003, which is incorporated herein in its entirety by reference.

TECHNICAL FIELD

The present invention relates to a rotary electric machine applied to PM motors (permanent magnet type synchronous motors) used in electric motorcars.

BACKGROUND ART

Among axial-gap type PM motors, one that is shown in FIG. 13 has been well known.

As shown in FIG. 13, this motor is so structured as to be arranged in a housing (frame) 1, and comprises a rotating shaft 7 rotatably supported by bearings 2, 3 fixed to the housing 1, a rotor 4 integrally attached to the rotating shaft 7, and a stator 5 arranged facing the rotor 4 and fixed to the housing 1.

The rotor 4 is made of a circular disc 6 of a ferromagnetic material, such as iron, and the rotating shaft 7 is mounted at the center of the disc 6 and rotatably supported at both ends thereof by the bearings 2, 3. On the surface of the circular disc 6 which faces the stator 5, N-pole magnets 8 and S-pole magnets 9 are arranged alternately in the circumferential direction as shown in FIG. 14.

The stator 5 comprises an annular stator yoke 10 fixed to the housing 1, and a plurality of teeth 11, which are press-fitted in a plurality of holes formed in the circumferential direction of the stator yoke 10. The stator teeth 11 are wound with coils 12 of wire.

Meanwhile, in electric cars, an in-wheel motor is mounted in the wheel to realize independent drive of the wheel. The in-wheel motor, which includes a reduction gear (change gearbox), is required to be flatter and thinner in structure. Flat-type PM motors such as the one mentioned above will find application as an in-wheel motor with a reduction gear.

In conventional axial-gap PM motors mentioned above, however, because they are incapable of utilizing reluctance torque, when they are used for in-wheel motors in electric-powered cars, there is a problem that the available range of rotation speed N is narrow.

Incidentally, the above-mentioned axial-gap type PM motor may be used as a generator.

Therefore, when used in a motorcycle or the like, in addition to the use as a starter motor to start the engine, and after the engine has started, this motor may be switched to a generator mode by using the driving force of the engine. This motor is hereafter referred to a starter-motor-cum-generator.

In other words, the starter-motor-cum-generator is used as a starter motor to start the engine and after the engine has started, it is used as a generator.

When the axial-gap type motor is used as a starter-motor-cum-generator as described above, the motor needs to generate a high torque to start the engine. A general method to realize a high torque has been to increase the magnetic force of the magnet of the motor.

With a conventional axial-gap type motor, since there is little hope that this motor gives reluctance torque, there has been no other choice but to increase the magnetic force of the magnet.

However, when the axial-gap motor is used as the starter-cum-generator, after the engine has started, the motor switches its operation to a generator mode, and need not generate a high torque. On the contrary, if the magnetic force of the motor magnet is increased to generate a high torque, when the generator is driven at high speed to generate electric power, the battery is likely to be overcharged, so that it is necessary to provide a voltage reducing circuit to protect batteries.

If the starter-motor-cum-generator is to be formed by using an axial-gap motor, the magnetic force of the motor magnet is desired to be large to secure a high torque at low rotation speed (when starting a car). However, to suppress overcharging of the battery at high rotation speed, there arises a contradictory demand to reduce the magnetic force of the motor magnet.

Therefore, an object of the present invention is to provide a rotary electric machine which is capable of utilizing reluctance torque when this rotary electric machine is used as a motor and thereby increasing the range of rotation speeds of the motor.

Another object of the present invention is to provide a rotary electric machine capable of preventing overcharge of the battery in its high-speed rotation and obviating the use of the voltage-reducing circuit when the rotary electric machine is used a starter-motor-cum-generator in vehicles, such as motorcycles.

DISCLOSURE OF THE INVENTION

According to the present invention, there is provided a rotary electric machine comprising a stator having a plurality of coils arranged in a substantially circular form around an axis and a rotor rotatable about the axis relative to the stator, wherein the rotor comprises a rotor yoke facing the coils and having a gap in axial direction, wherein the rotor yoke is made of a circular disc of a ferromagnetic material, and wherein depressed and raised portions are provided alternately in a circumferential direction on a surface of the rotor yoke facing the coils, and N-pole magnets and S-pole magnets are alternately arranged in the depressed portions.

According to the present invention of a structure described above, the raised portions are formed between the N-pole magnets and the S-pole magnets on the rotor yoke side, and the raised portions face the coils on the stator side. Therefore, supposing that the invention is a motor, a reluctance torque can be generated between the raised portions on the rotor yoke side and the teeth (coils) of the stator side, making it possible to increase the range of rotation speed of the motor.

According to the present invention, since raised portions are provided on the rotor yoke, the quantity of the magnet in use can be reduced by an amount due to that structural betterment than before, which makes it possible to decrease production cost.

Further according to the present invention, the magnetic force of the magnet can be made smaller than before, but a reluctance torque can be generated as described above.

Therefore, when this invention is applied in forming a starter-motor-cum-generator for vehicles, such as motorcycles, a high torque can be obtained by using the reluctance torque at low rotation speed (as in starting a car), and because the magnetic force of the magnets is made small, the battery is prevented from being overcharged at high rotating speed, a fact which obviates the need to use the voltage-reducing circuit.

Further according to the present invention, there is provided a rotary electric machine comprising a stator having a plurality of coils arranged in a substantially circular form around an axis and a rotor rotatable about the axis relative to the stator, wherein said rotor comprises a rotor yoke facing the coils and having a gap in axial direction, wherein the rotor yoke is made of a circular disc of a ferromagnetic material, wherein a corrugated region having raised and depressed cross-sections alternating with each other is formed in a circumferential direction of the rotor yoke and magnets are arranged in the depressed portions, and wherein out of all depressed portions, in those depressed portions on a surface side of the rotor yoke facing the coils, N-pole magnets and S-pole magnets are arranged alternately.

According to the invention of the structure as described, on the rotor yoke side, the raised portions are formed, each sandwiched between an N-pole magnet and an S-pole magnet, and the raised portions face the coils on the stator side. For this reason, when the present invention is applied in forming a motor, it is possible to generate a reluctance torque at the raised portions on the yoke side in collaboration with the teeth on the stator side, and thereby increase the range of rotation speed of the motor.

Further according to the present invention, the magnetic force of the magnet can be made smaller than before, but a reluctance torque can be generated as described above. Therefore, when this invention is applied in forming a starter-motor-cum-generator for vehicles, such as motorcycles, a high torque can be obtained by using the reluctance torque at low rotation speed (as in starting a car), and because the magnetic force of the magnets is made small, the battery is prevented from being overcharged at high rotating speed, a fact which obviates the need to use the voltage-reducing circuit.

As an embodiment of the present invention, a ferromagnetic material is further applied to that surface side of the rotor yoke which does not face the coils.

According to the embodiment structured as described, the rotor yoke is improved in mechanical strength and also the flux leakage from the magnet can be prevented.

According to the present invention, there is provided a rotary electric machine comprising a stator having a plurality of coils arranged in a substantially circular form around an axis and a rotor rotatable about the axis relative to the stator, wherein the rotor comprises a rotor yoke facing the coils and having a gap in axial direction, and wherein the rotor yoke is made of a circular disc of a ferromagnetic material, wherein N-pole magnets and S-pole magnets are mounted alternately in the circumferential direction on a surface of the rotor yoke facing the coils, and wherein salient portions facing the teeth of the coils are provided at predetermined intervals in predetermined positions in the circumferential direction of an outer periphery of the rotor yoke.

In this invention, as described, salient portions are provided along the outer periphery of the rotor yoke. As a result, a reluctance torque can be generated in collaboration with the teeth of the stator side, so that it is possible to widen the range of rotation speed of the motor.

Further according to this invention, the magnetic force of the magnet can be made weaker than before, but a reluctance torque can be generated as described above. Therefore, when this invention is applied in forming a starter-motor-cum-generator for vehicles, such as motorcycles, a high torque is obtained by using a reluctance torque at low rotating speed (when starting a car), and when this electric machine is rotated at high speed, because the magnetic force of the magnet is made small, the battery is prevented from being overcharged and a voltage-reducing circuit is not required.

As an embodiment of the present invention, the above-mentioned salient portions are formed as bent portions bent toward the stator side.

According to this embodiment, the bent portions are provided along the outer periphery of the rotor yoke. Therefore, if a motor is formed according to this embodiment, a reluctance torque can be generated at the bent portions on the rotor yoke side in collaboration with the teeth on the stator side, and therefore it is possible to increase the range of rotation speed.

Further according to the present invention, there is provided a rotary electric machine comprising a stator having a plurality of coils arranged in a substantially circular form around an axis and a rotor rotatable about the axis relative to the stator, wherein the rotor comprises a rotor yoke facing the coils and having a gap in axial direction, wherein the rotor yoke is made of a circular disc of a ferromagnetic material, and wherein a hollow part, in which a rotating shaft is press-fitted, is formed in the center of the rotor yoke in a manner integrally with the rotor yoke and a circularly curved surface is formed at an extreme end of the hollow part.

According to the present invention structured as described, the circularly curved surface at the extreme end of hollow part may be used as a bearing to bear a thrust, and the rotor and the thrust bearing may be combined into a single structure, by which the rigidity of the structure for rotating the rotor can be improved.

BRIEF DESCRIPTION OF THE DRAWINGS

FIG. 10 is a plan view of the rotor in FIG. 9 as viewed from the stator side;

BEST MODE FOR CARRYING OUT THE INVENTION

Embodiments of the present invention will be described with reference to the accompanying drawings.

Figure 1:
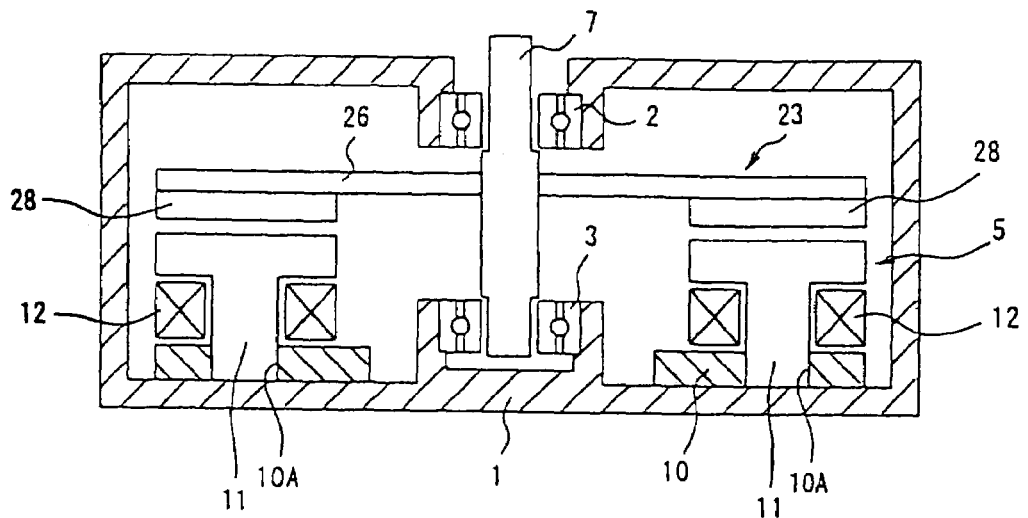
FIG. 1 is a sectional view showing the whole structure of an axial-gap motor according to a first embodiment of a rotary electric machine of the present invention.
Figure 2:
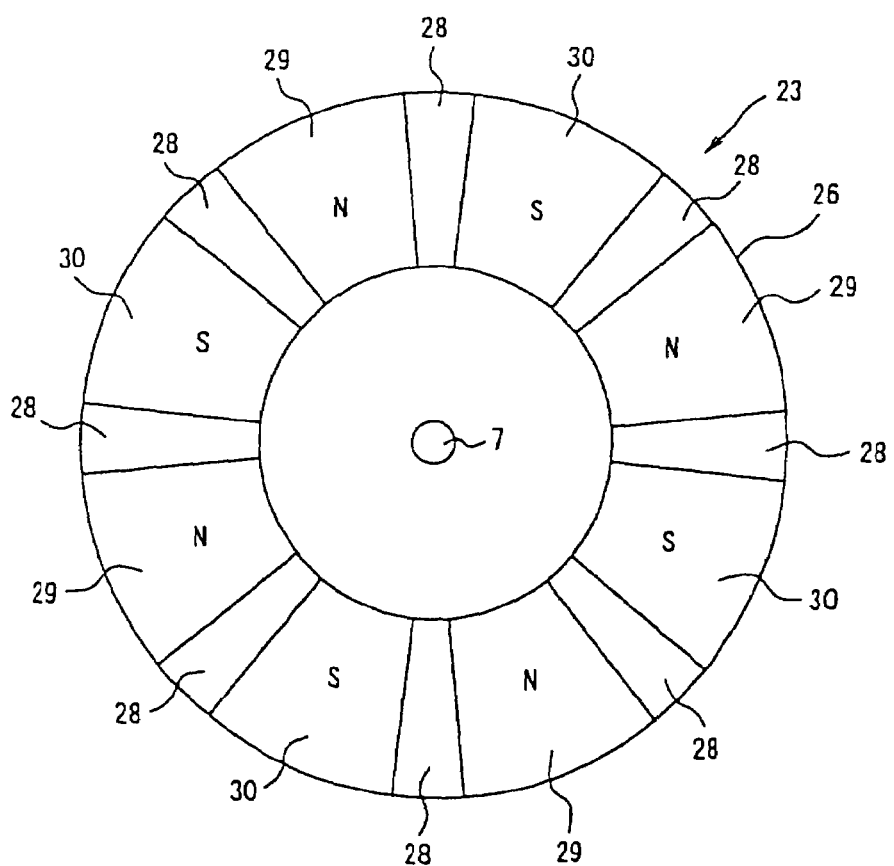
FIG. 2 is a plan view of the rotor in FIG. 1 as viewed from the stator side.
Figure 3:
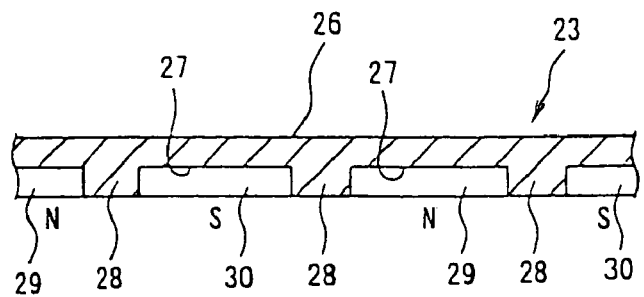
FIG. 3 is a fragmentary sectional view, taken in circumferential direction, of an essential part of the rotor in FIG. 2.

Referring to FIGS. 1 to 3, the structure of a first embodiment will be described in which the rotary electric machine of the present invention is applied to an axial-gap motor. A motor according to the first embodiment, which is disposed in a housing 1 as shown in FIG. 1, comprises a rotating shaft 7 rotatably supported by bearings 2, 3 fixed to the housing 1, a rotor 23 mounted integrally to the rotating shaft 7, and a stator 5 arranged facing the rotor 23 and fixed to the housing 1.

The stator 5 has a plurality of coils arranged in a substantially circular (annular) form about the rotating shaft 7. In other words, the stator 5 has an annular stator yoke 10 fixed to the housing 1. A plurality of holes 10A are provided at predetermined intervals in circumferential direction of the stator yoke 10, and teeth 11 are press-fitted into the holes 10A. The stator teeth 11 are each wound with coils of wire 12.

The rotor 23 comprises a rotor yoke 26 made of a disc of ferromagnetic material, such as iron, and the rotating shaft 7 is mounted at the center of the rotor yoke 26 and is rotatably supported at each end by the bearings 2 and 3. On that surface area of the rotor yoke 26 which faces the stator 5 exclusive of the center area (in other words, only on that area of the surface squarely facing the stator 5), the depressed portions 27 and the raised portions 28 are attached by being alternately arranged in circumferential direction of the rotor yoke 26 as shown in FIG. 3. In the depressed portions 27, N-pole magnets 29 and S-pole magnets 30 are alternately placed and fixed as shown in FIGS. 2 and 3.

As described above, in the first embodiment, the N-pole magnets 29 and the S-pole magnets 30 are arranged alternately on the rotor yoke 26, the raised portions 28 are formed between the magnets 29 and 30, and the raised portions 28 face the teeth 11 of the stator side 5. Therefore, according to the first embodiment, in addition to the torque generated by the magnets 29 and 30, the reluctance torque is generated between the raised portions 28 on the rotor yoke side 26 and the teeth 11 (coils) on the stator side 5, which makes it possible to increase the range of rotation speed of the motor.

Further according to the first embodiment, in which the raised portions 28 are provided on the rotor yoke 26, the used quantity of magnet can be made smaller than before, and the production cost can be decreased.

Meanwhile, when applied to vehicles, such as motorcycles, the first embodiment may be applied in forming a starter-motor-cum-generator. More specifically, the rotary electric machine can be used as a starter motor to start the engine, and after the engine has started, it can be used as a generator.

On the other hand, according to the first embodiment, the magnetic force of the magnets 29, 30 can be made smaller than before, but a reluctance torque can be generated.

Therefore, when the first embodiment is applied in forming a starter-motor-cum-generator for vehicles, such as motorcycles, a high torque can be obtained by this electric machine by using a reluctance torque when it is operated at low rotating speed (when starting a car). When this electric machine rotates at high rotating speed, because the magnetic force of the magnets 29, 30 is decreased, the battery is prevented from being overcharged. Therefore, a voltage-reducing circuit is not required.

Figure 4:
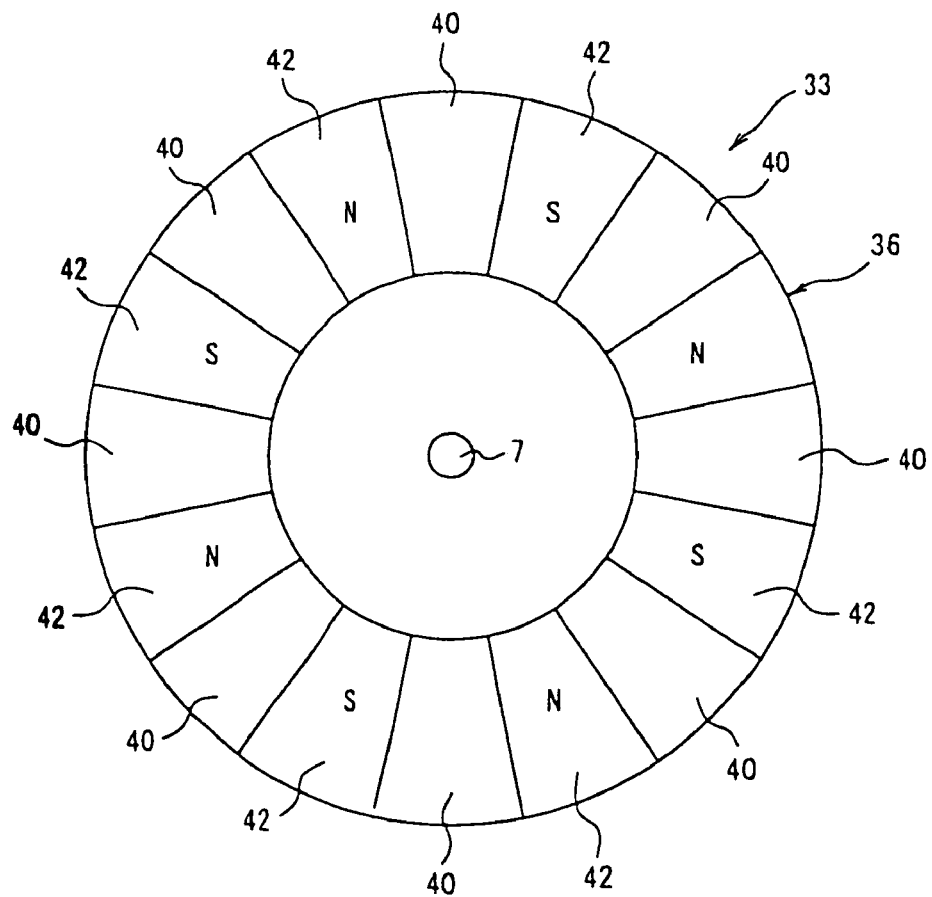
FIG. 4 is a plan view showing the structure of the rotor of an axial-gap motor as viewed from the stator side according to a second embodiment of a rotary electric machine of the present invention.
Figure 5:
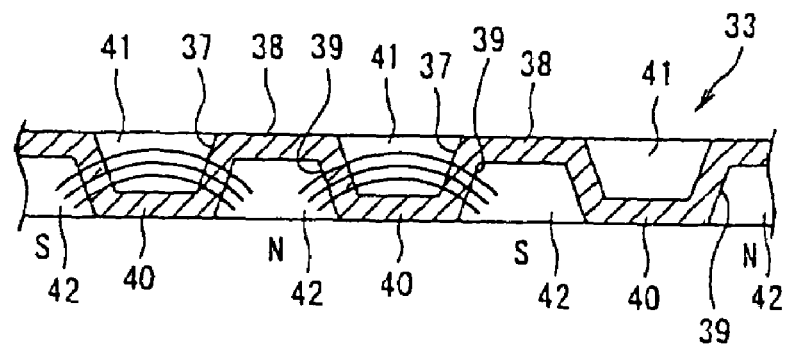
FIG. 5 is a fragmentary sectional view, taken in circumferential direction, of an essential part of the rotor in FIG. 4.

Referring to FIGS. 4 and 5, description will be made of the structure of a second embodiment in which the rotary electric machine of the present invention is applied to an axial-gap motor.

A motor according to the second embodiment is structured such that the rotor 23 of the motor of the first embodiment is used instead of the rotor 33 shown in FIGS. 4 and 5; however, the other parts are the same as in the motor according to the first embodiment and their structural descriptions are omitted.

As shown in FIG. 4, the rotor 33 comprises a disc rotor yoke 36 made of ferromagnetic material, such as iron, and a rotating shaft 7 is mounted at the center of the rotor yoke 36.

The rotor yoke 36 has a corrugated region formed in circumferential direction of the rotor yoke except for the center region thereof; the corrugated region has raised and depressed cross-sections alternating with each other in the circumferential direction of the rotor yoke (Refer to FIG. 5). Therefore, as shown in FIG. 5, in the circumferential direction of the rotor yoke 36, the depressed portions 37 and the raised portions 38 are formed alternately on an upper surface side of the rotor yoke 36 and depressed portions 39 and raised portions 40 are formed alternately on a lower surface side of the rotor yoke facing the stator (not shown).

On both surfaces of the corrugated region, magnets 41, 42 are arranged and fixed in the depressed portions 37, 39 as shown in FIG. 5. Further, the magnets 42 set in the depressed portions 39 on the lower surface side are magnetized such that N-pole magnets and S-pole magnets are formed (magnetized) alternately. The magnets 41, 42 should preferably be anisotropic-magnetized.

As described above, according to the second embodiment, on that surface of the rotor yoke 36 which faces the stator, raised portions 40 are arranged between the N-pole magnets and the S-pole magnets, and the raised portions 40 can face the matching teeth of the stator.

Therefore, according to the second embodiment, in addition to the torque generated by the magnets 42, a reluctance torque is generated between the raised portions 40 on the rotor yoke 36 side and the teeth on the stator side, so that it is possible to increase the range of rotation speed of the motor.

Moreover, according to the second embodiment, the rotor yoke 36 can be produced at low cost by press working.

Further according to the second embodiment, the magnetic force of the magnets 41, 42 can be decreased, but a reluctance torque can be generated as has been described.

Accordingly, when the second embodiment is applied in forming a starter-motor-cum-generator for a motorcycle or a similar vehicle, a high torque can be generated by using a reluctance torque at slow rotating speed (when starting a car). When this rotary electric machine is operated at high rotation speed, because the magnetic force of the magnets 41,42 is decreased, the battery can be prevented from being overcharged. Therefore, a voltage-reducing circuit is not required.

A modified example of the rotor 33 will next be described with reference to FIG. 6.

Figure 6:
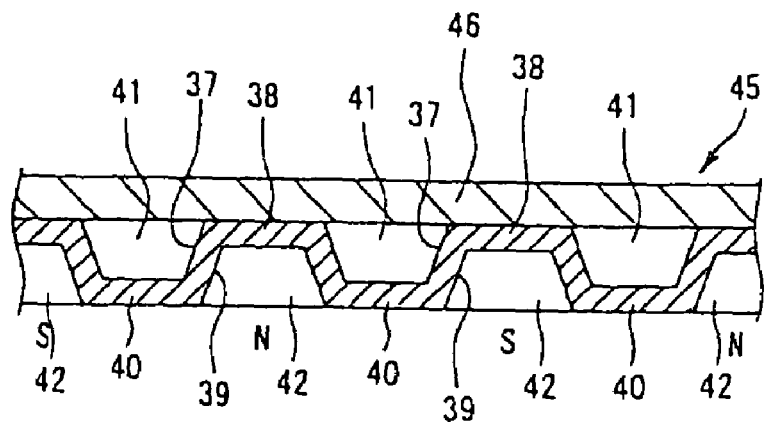
FIG. 6 is a sectional view of an essential part showing a modification of the rotor shown in FIG. 4.

A rotor 45 in FIG. 6 is formed by integrally attaching a disc core 46 of a ferromagnetic material to the upper surface of the rotor 33 shown in FIGS. 4 and 5. Consequently, the mechanical strength of the rotor 33 can be increased and it is possible to prevent magnetic flux leakage from the magnets 41, 42.

Note that the other parts of the rotor 45 are identical in structure with those of the rotor 33 and the same components are designated by the same reference numerals, and their structural descriptions are omitted.

Figure 7:
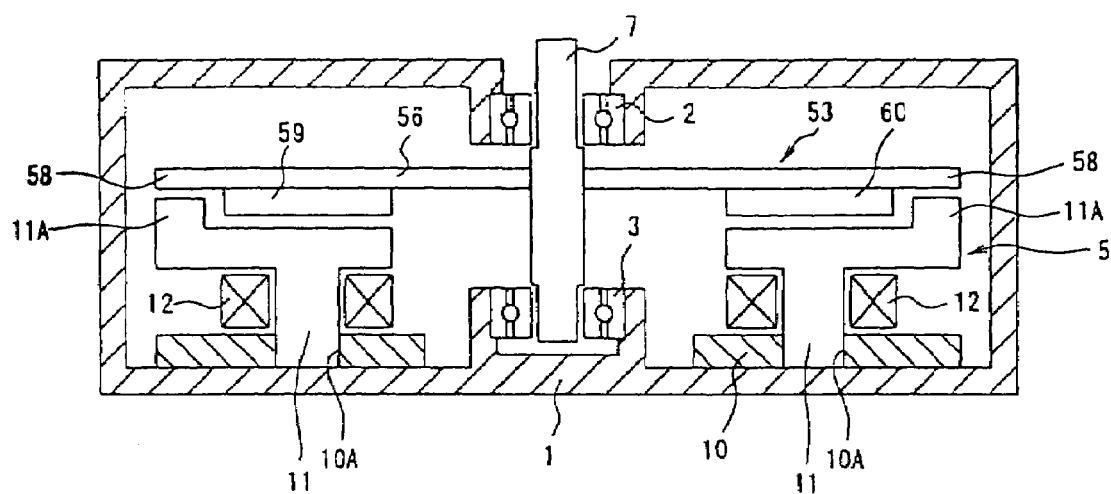
FIG. 7 is a sectional view showing the whole structure of an axial-gap motor according to a third embodiment of a rotary electric machine of the present invention.
Figure 8:
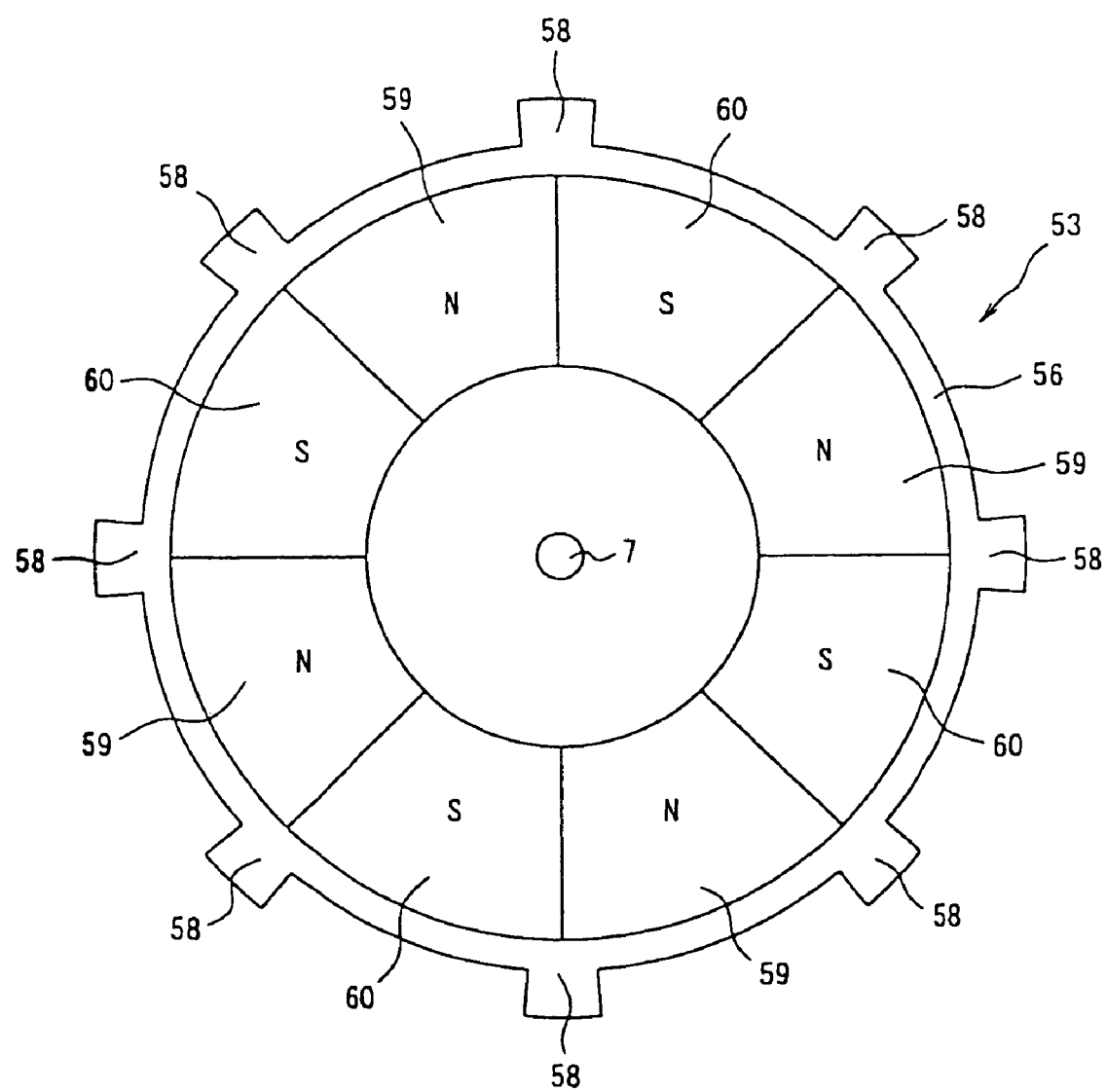
FIG. 8 is a plan view of the rotor in FIG. 7 as viewed from the stator side.

Referring to FIGS. 7 and 8, description will be made of the structure of a third embodiment in which the rotary electric machine of the present invention is applied to an axial-gap motor.

A motor according to the third embodiment, which is disposed in the housing 1 as shown in FIG. 7, comprises a rotating shaft 7 rotatably supported by bearings 2, 3 fixed to the housing 1, a rotor 53 mounted integrally to the rotating shaft 7, and a stator 5 arranged facing the rotor 53 and fixed to the housing 1.

The rotor 53 comprises a rotor yoke 56 made of a disc of a ferromagnetic material, such as iron, and the rotating shaft 7 is mounted at the center of the rotor yoke 56 and rotatably supported at both ends thereof by the bearings 2, 3. On that surface which faces the stator 5 of the rotor yoke 56 exclusive of the center area and the peripheral area (in other words, only on that area of the surface area squarely facing the stator 5), N-pole magnets 59 and S-pole magnets 60 are attached by being alternately arranged in the circumferential direction as shown in FIG. 8.

Radially-salient portions 58 are formed integrally with the rotor yoke 56 at the positions on the outer circumference of the rotor yoke 56 where the outer circumference is intersected by extensions of the boundaries between the N-pole magnets 59 and the S-pole magnets 60, as shown in FIGS. 7 and 8. Those salient portions 58 are provided to generate reluctance torque in collaboration with the teeth of the stator 5.

The stator 5 is basically the same in structure as the stator 5 shown in FIG. 1, but since the salient portions 58 are added to the rotor yoke 56, the salient portions 11A to generate reluctance torque by coming to face the salient portions 58 are added to the teeth 11 of the stator.

As described above, according to the third embodiment, the salient portions 58 are added to the outer periphery of the rotor yoke 56, and the salient portions 58 come round to face the salient portions 11A of the teeth 11 of the stator side 5. Therefore, according to the third embodiment, in addition to the torque generated by the magnets 59 and 60, reluctance torque is generated between the salient portions 58 of the rotor yoke 56 and the salient portions 11A of the teeth on the stator side 5, and therefore it is possible to increase the range of rotation speed of the motor.

Because the salient portions 58 are added to the outer circumference of the rotor yoke 56 in the third embodiment, their phase positions relative to those of the magnets 59, 60 can be optimized.

Further, according to the third embodiment, the magnetic force of the magnets 59, 60 can be decreased, but reluctance torque can be generated as described above.

Therefore, when the third embodiment is applied In forming a starter-motor-cum-generator for vehicles, such as motorcycles, a high torque can be obtained by using reluctance torque when this motor/generator is rotated at low rotation speed (when starting a car). When this motor/generator is rotated at high speed, because the magnetic force of the magnets 59, 60 is decreased, the battery can be prevented from being overcharged. Therefore, a voltage-reducing circuit is not required.

Figure 9:
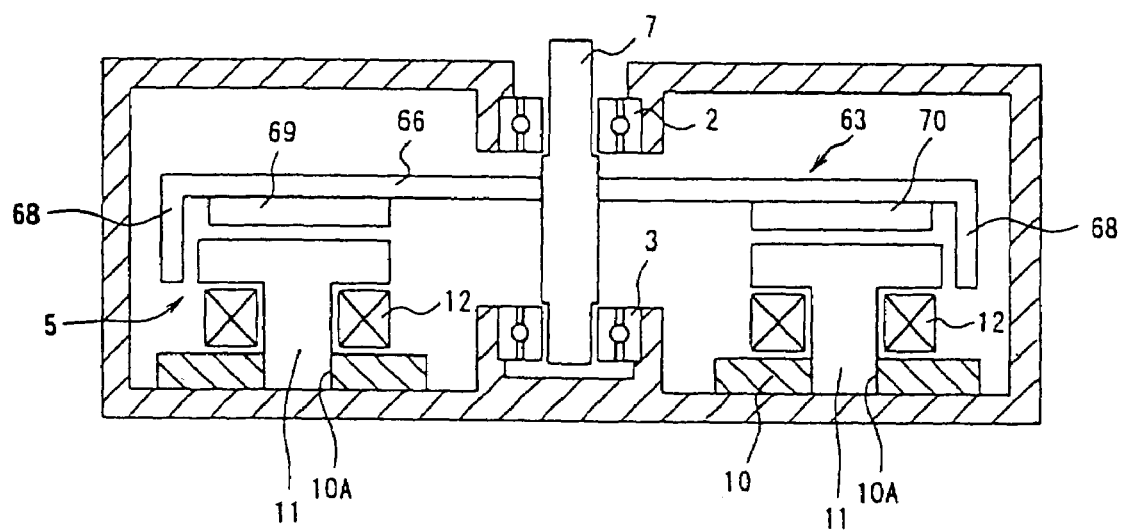
FIG. 9 is a sectional view showing the whole structure of an axial-gap motor according to a fourth embodiment of a rotary electric machine of the present invention.

Referring to FIGS. 9 and 10, description will be made of a fourth embodiment in which the rotary electric machine of the present invention is applied to an axial-gap motor.

The motor according to the fourth embodiment, which is disposed in the housing 1 s shown in FIG. 9, comprises a rotating shaft 7 rotatably supported by bearings 2, 3 fixed to the housing 1, a rotor 63 integrally attached to the rotating shaft 7, and a stator 5 arranged facing the rotor 63 and fixed to the housing 1.

The rotor 63 is made of a circular-disc rotor yoke 66 of a ferromagnetic material, such as iron, and the rotating shaft 7 is mounted at the center of the rotor yoke 66 and rotatably supported at both ends thereof by the bearings 2, 3. On that surface area of the rotor yoke 66 which faces the stator 5 exclusive of the center area and the peripheral area (in other words, only on that area of the surface squarely facing the stator 5), the N-pole magnets 69 and the S-pole magnets 70 are arranged alternately in the circumferential direction of the rotor yoke 66 as shown in FIG. 10.

As shown in FIGS. 9 and 10, bent portions 68 bent down at right angle to the stator side 5 are provided integrally with the rotor yoke 66 at positions on the outer circumference of the rotor yoke 66 where the outer circumference is intersected by extensions of the boundaries between the N-pole magnets 69 and the magnets 70. Those bent portions 68 are provided to generate reluctance torque in collaboration with the teeth of the stator 5.

The stator 5 is basically the same in structure as that of the stator 5 shown in FIG. 1, but because the bent portions 68 are added to the rotor yoke 66, the teeth 11 are so formed as to generate reluctance torque as they face the bent portions 68.

As described above, according to the fourth embodiment, the bent portions 68 are formed on the rotor yoke 66, and those bent portions 68 come round to face the teeth 11 of the stator side 5. As a result, according to the fourth embodiment, besides the torque generated by the magnets 69 and 70, reluctance torque is generated between the bent portions 68 on the rotor yoke 66, so that it is possible to enlarge the range of rotation speed of the motor.

Further according to the fourth embodiment, since the bent portions 68 are added to the outer circumference of the rotor yoke 66, their phase positions relative to those of the magnets 69 and 70 can be optimized.

Further according to the fourth embodiment, because the bent portions 68 are formed on the rotor yoke 66 in a manner to generate reluctance torque, compared with the third embodiment the diameter of the rotor 63 can be made smaller, and as a result, the diameter of the whole motor can be made smaller.

Moreover, according to the fourth embodiment, the magnetic force of the magnets 69 and 70 can be decreased, but the reluctance torque can be generated as described above.

Consequently, when the fourth embodiment is applied in forming a starter-motor-cum-generator for use in vehicles, such as motorcycles, a high torque can be obtained by using reluctance torque when this motor/generator is running at low speed (as in starting a car). When the motor/generator is running at high speed, because the magnetic force of the magnets 69 and 70 is deceased, the battery can be prevented from being overcharged, making it unnecessary to use a voltage-reducing circuit.

Figure 11:
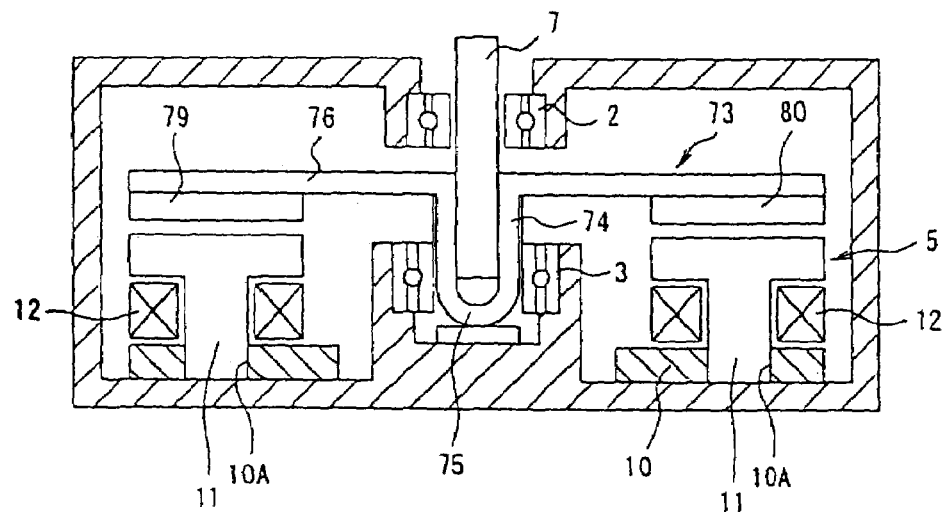
FIG. 11 is a sectional view showing the whole structure of an axial-gap motor according to a fifth embodiment of a rotary electric machine of the present invention.
Figure 12:
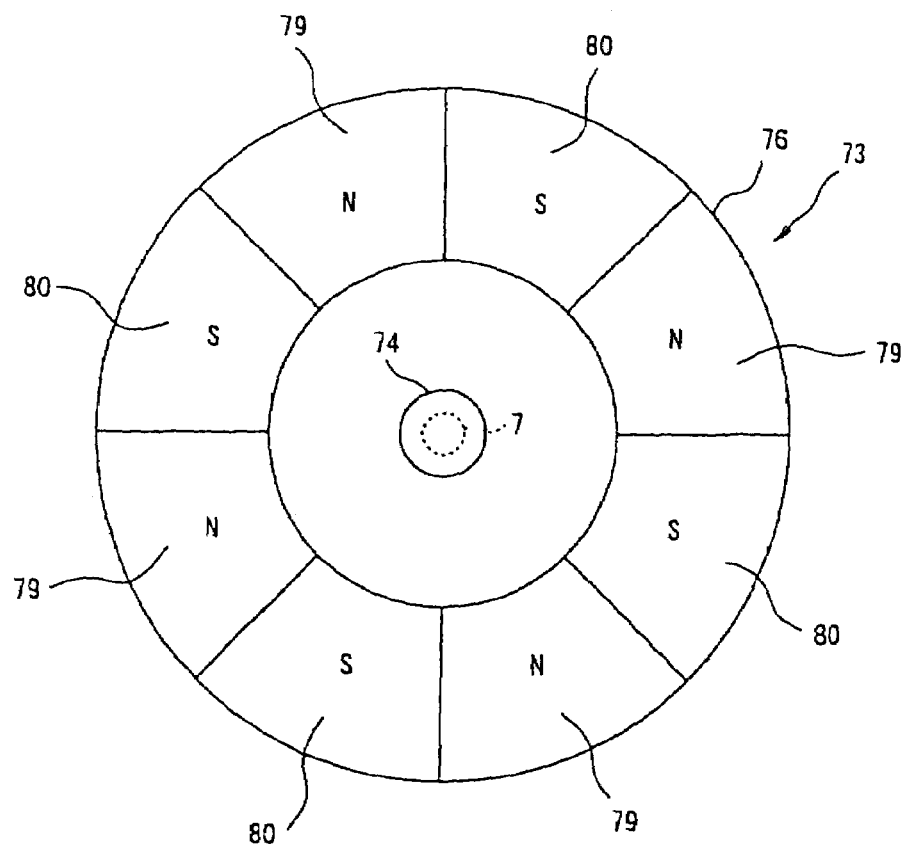
FIG. 12 is a plan view of the rotor in FIG. 11 as viewed from the stator side.

Referring to FIGS. 11 and 12, description will be made of a fifth embodiment in which the rotary electric machine of the present invention is applied to an axial-gap motor.

The motor according to the fifth embodiment, which is disposed in the housing 1 as shown in FIG. 11, comprises a rotor 73 rotatably supported by bearings 2 and 3 fixed to the housing 1, and a stator 5 arranged facing the rotor 73 and fixed to the housing 1.

The rotor 73 includes a rotor yoke 76 and a rotating shaft 7 as shown in FIGS. 11 and 12. The rotor yoke 76 is formed of a disc entirely made of a ferromagnetic material, and a hollow part 74, in which a rotating shaft 7 is press-fitted, is formed in a manner integrally with the rotor yoke 76. A semispherical part (circularly curved surface) 75 is formed integrally with the hollow part 74 at an extreme end thereof, and the semispherical part 75 is used as a bearing to bear the thrust of the rotor 73.

The hollow part 74 and the semispherical part 75 are formed by drawing when the rotor yoke 76 is formed in a monolithic body. In addition, the semispherical part 75 is hardened to increase its mechanical strength.

The rotating shaft 7 is mounted integrally with the rotor yoke 76 at the center thereof by being press-fitted into the hollow part 74. The rotating shaft 7 and the hollow part 74 are supported at one end by the bearing 2 or 3, and the semispherical part 75 is arranged as a bearing to bear the thrust of the rotor yoke 76.

On that surface of the rotor yoke 76 which faces the stator 5 exclusive of the center area, N-pole magnets and S-pole magnets 80 are attached by being arranged alternately in circumferential direction of the rotor yoke 76 as shown in FIGS. 11 and 12.

The stator 5 is the same in structure as the stator shown in FIG. 1, and the same components are designated by the same reference numerals and their descriptions are omitted.

According to the fifth embodiment, the semispherical part 75 formed integrally with an extreme end of the hollow part 74 can be used as a bearing to bear the thrust, and further the thrust bearing can be formed integrally with the rotor yoke 76. By this arrangement, the rigidity of the structure for rotation of the rotor 73 can be improved.

Figure 13:
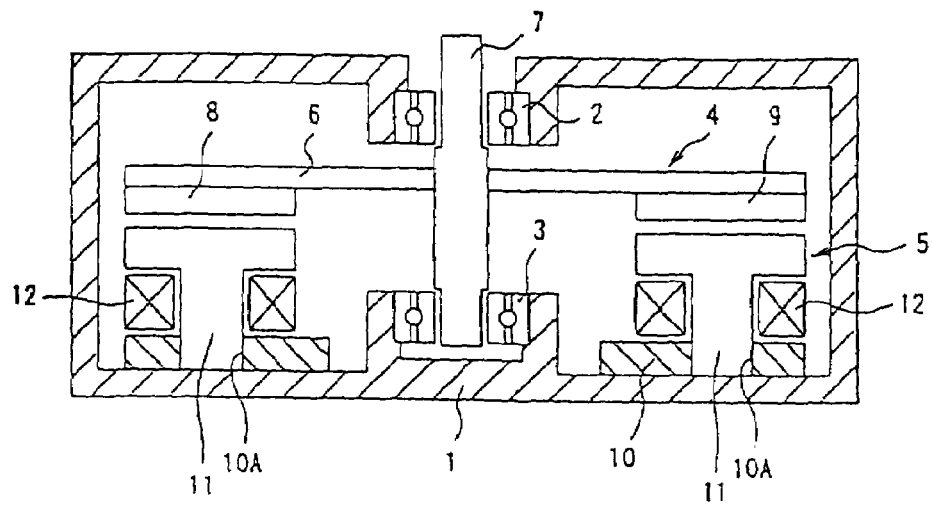
FIG. 13 is a sectional view showing an example of a conventional axial-gap motor.
Figure 14:
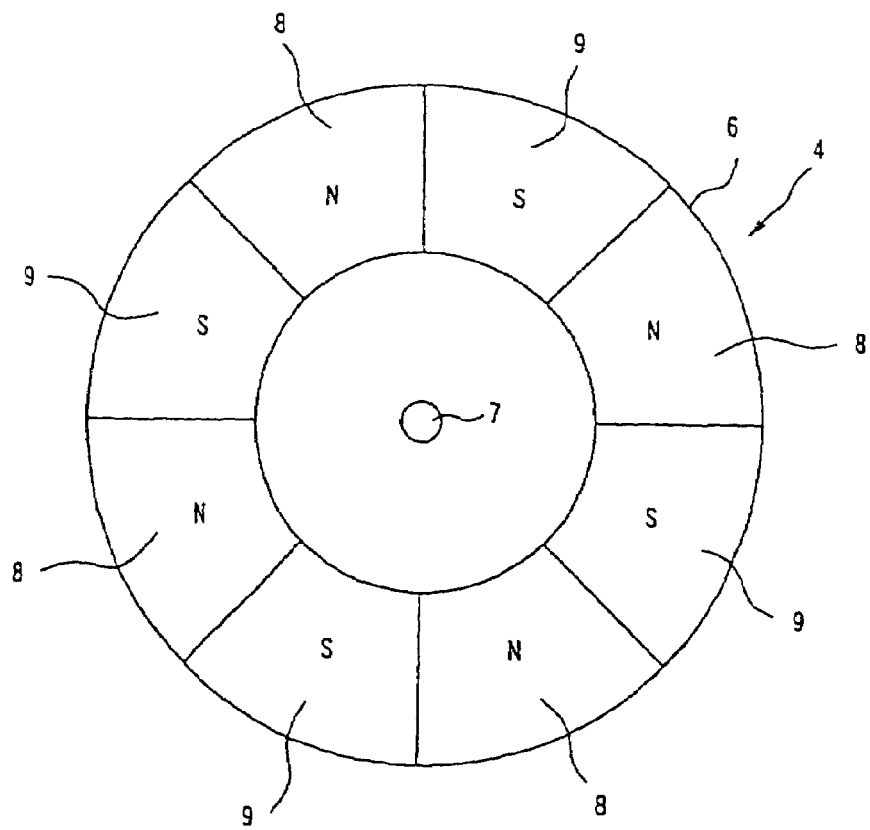
FIG. 14 is a plan view of the conventional rotor as viewed from the stator side.

The rotor 73 of the fifth embodiment is designed based on the conventional rotor 4 shown in FIG. 13 and is structured by being added with the hollow part 74 and the semispherical part 75.

However, alternatively, it is possible to use the rotor based on the rotor 23, 33, 45, 53 or 63 according to the first to fourth embodiments, and add the hollow part 74 and the semispherical part 75.

In the first to fifth embodiments, description has been made of cases where the rotary electric machine of the present invention is applied to an axial-gap motor and cases where a starter-motor-cum-generator for vehicles, such as motorcycles, is formed by this rotary electric machine. However, the rotary electric machine according to the present invention can be applied as power generators of the types mentioned above, in which case the structure of such a generator will be substantially the same structure of the relevant embodiment.

INDUSTRIAL APPLICABILITY

According to the present invention, when the present invention is applied as a motor, reluctance torque can be generated between the raised portions on the rotor yoke side and the teeth (coils) on the stator side, for example, by which it is possible to increase the range of rotation speed of the motor.

Further, according to the present invention, when to present invention is applied in forming a starter-motor-cum-generator for vehicles, such as motorcycles, a high torque can be obtained by using reluctance torque when this motor/generator operates at low rotation speed (as in starting a car). Further, when this motor/generator operates at high rotation speed, because the magnetic force of the magnets is made smaller, overcharging can be prevented. Accordingly, a voltage-reducing circuit is not required.

What is claimed is:

1. A rotary electric machine comprising a stator having a plurality of coils arranged in a substantially circular form around an axis and a rotor rotatable about said axis relative to said stator, wherein said rotor comprises a rotor yoke facing said coils and having a gap in axial direction, wherein said rotor yoke is made of a circular disc of a ferromagnetic material, and wherein a corrugated region having depressed portions and raised portions alternating with each other is formed in a circumferential direction of said rotor yoke, said depressed portions on a first surface of the corrugated portions formed in the portions corresponding to said raised portions on a second surface of the corrugated portions and said raised portions on said first surface of the corrugated portions formed in the portions corresponding to said depressed portions on said second surface of the corrugated portions, and magnets are arranged in said depressed portions on both surfaces of the corrugated portions, said raised portions are made of said ferromagnetic material and wherein out of all depressed portions, in those depressed portions on a surface side of said rotor yoke facing said coils, N-pole magnets and S-pole magnets are arranged alternately.

2. The rotary electric machine according to claim 1, wherein a ferromagnetic material is further applied to that surface side of said rotor yoke which does not face said coils.

3. The rotary electric machine according to claim 2 wherein said N-pole magnets and said S-pole magnets are anisotropic-magnetized.

4. The rotary electric machine according to claim 2 wherein said rotor yoke further comprises:
a hollow part located about the axis and fixed to an end of said shaft for rotation therewith, the hollow part including a semispherical end part surrounding said end of said shaft.

5. The rotary electric machine according to claim 4 wherein said semispherical end part comprises a hardened material.

6. The rotary electric machine according to claim 4 wherein said N-pole magnets and said S-pole magnets are anisotropic-magnetized.

7. The rotary electric machine according to claim 1 wherein said rotor yoke further comprises:
a hollow part located about the axis and fixed to an end of said shaft for rotation therewith, the hollow part including a semispherical end part surrounding said end of said shaft.

8. The rotary electric machine according to claim 7 wherein said semispherical end part comprises a hardened material.

9. The rotary electric machine according to claim 8 wherein said N-pole magnets and said S-pole magnets are anisotropic-magnetized.

* * * * *

UNITED STATES PATENT AND TRADEMARK OFFICE
CERTIFICATE OF CORRECTION

PATENT NO. : 7,259,488 B2
APPLICATION NO. : 11/496647
DATED : August 21, 2007
INVENTOR(S) : Shinya Naito et al.

It is certified that error appears in the above-identified patent and that said Letters Patent is hereby corrected as shown below:

Title Page;

Title page, item (75) Column 1, Lines 1-2; Delete "Hino Haruyoshi" and insert -- Haruyoshi Hino --, therefor.
Page 2, Column 1, Line 1; After "53115012" delete "7/1978" and insert -- 10/1978 --, therefor.
Page 2, Column 1, Line 2; After "54098905" delete "4/1979" and insert -- 8/1979 --, therefor.
Column 7, Line 53; After "applied" delete "In" and insert -- in --, therefor.
Column 9, Line 58; After "when" delete "to" and insert -- the --, therefor.

Signed and Sealed this

Sixth Day of November, 2007

JON W. DUDAS
*Director of the United States Patent and Trademark Office*